(No Model.) 2 Sheets—Sheet 1.

G. H. PERKINS.
MEASURING FAUCET FOR WAGON TANKS.

No. 394,391. Patented Dec. 11, 1888.

WITNESSES
P. F. dagle
F. Norman Dixon.

INVENTOR:
George H. Perkins,
By his Attorneys (No Model.) 2 Sheets—Sheet 2.

G. H. PERKINS.
MEASURING FAUCET FOR WAGON TANKS.

No. 394,391. Patented Dec. 11, 1888.

WITNESSES:
P. F. Eagle
J. Norman Dixon.

INVENTOR:
G. H. Perkins
By his Attorneys,
Trawarick
Bonsall Taylor

UNITED STATES PATENT OFFICE.

GEORGE H. PERKINS, OF PHILADELPHIA, PENNSYLVANIA.

MEASURING-FAUCET FOR WAGON-TANKS.

SPECIFICATION forming part of Letters Patent No. 394,391, dated December 11, 1888.

Application filed July 21, 1888. Serial No. 280,644. (No model.)

*To all whom it may concern:*

Be it known that I, GEORGE H. PERKINS, a citizen of the United States, residing in the city and county of Philadelphia, and State of Pennsylvania, have invented certain new and useful Improvements in Wagon Tanks, of which the following is a specification.

My invention relates to such tank or bulk wagons as are employed by oil refiners or dealers for retailing oil, and it is the object of my invention to check or prevent stealing by the wagon driver by rendering impossible a false return of the amount of oil drawn from the wagon and sold by the driver.

It is the object of my invention to so construct an oil wagon tank as to render it impossible at a single drawing to draw either a predetermined quantity of oil, usually five gallons, or less than such predetermined quantity, without registering the theoretical amount calculated and supposed at each single drawing to be drawn, and this object I accomplish by devices represented in the accompanying drawings and described in this specification, the particular subject matter claimed as novel being hereinafter definitely specified.

Figure 1:
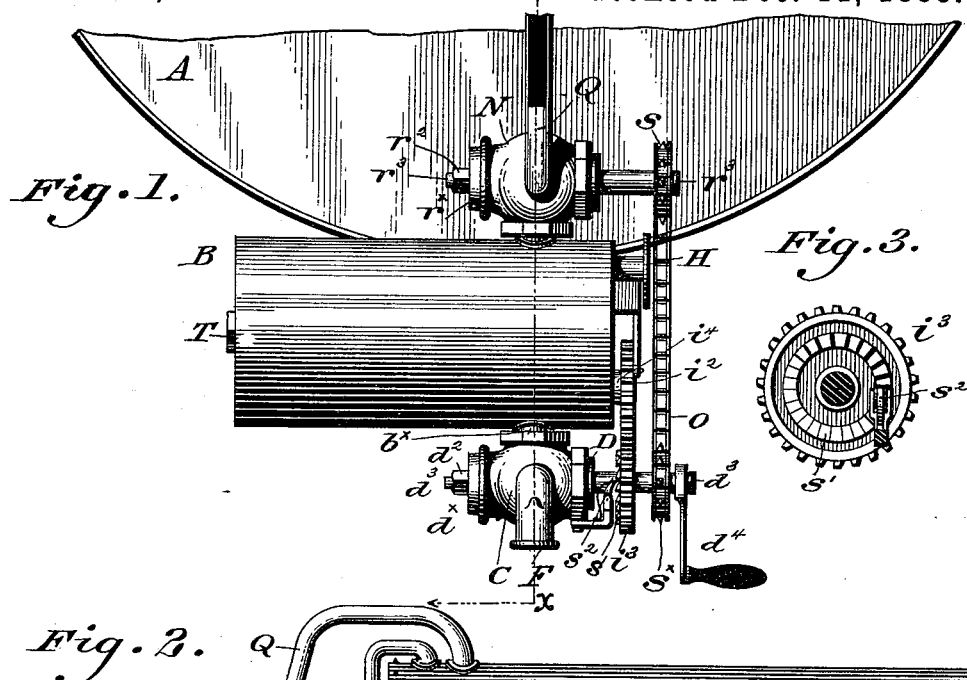
Figure 3:
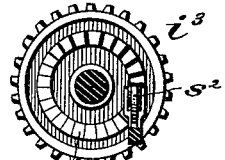
Figure 2:
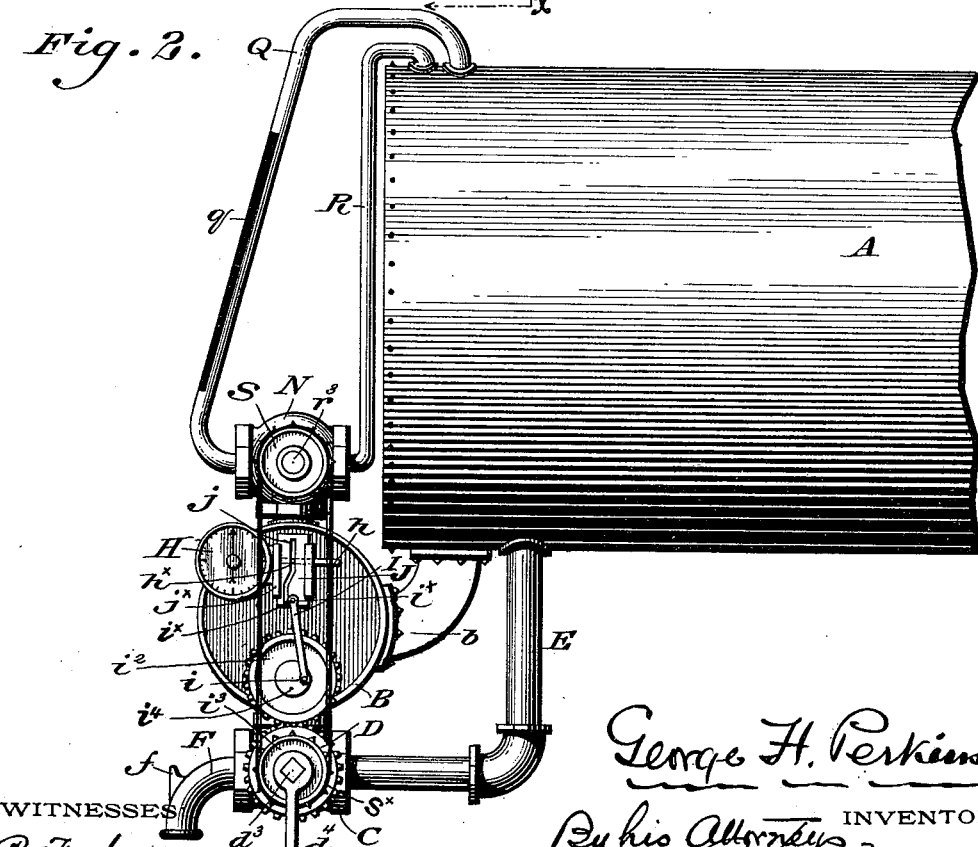
Figure 7:
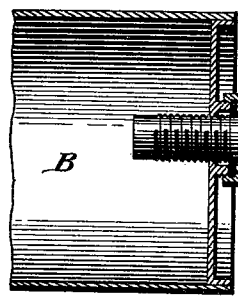
Figure 6:
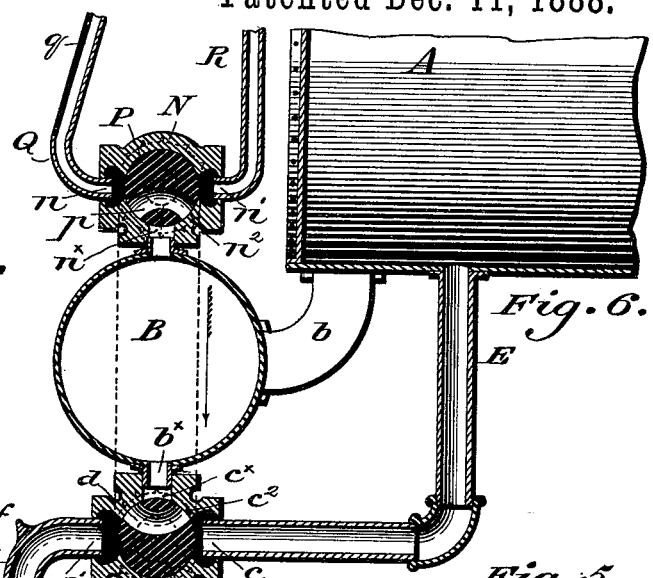
Figure 4:
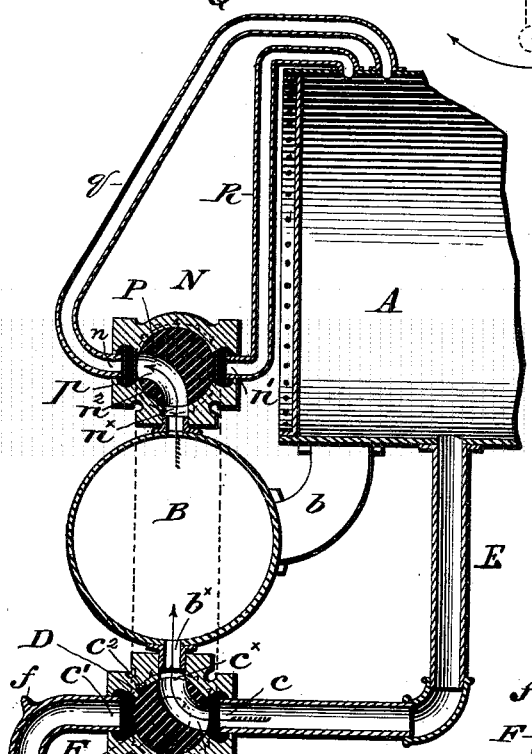
Figure 5:
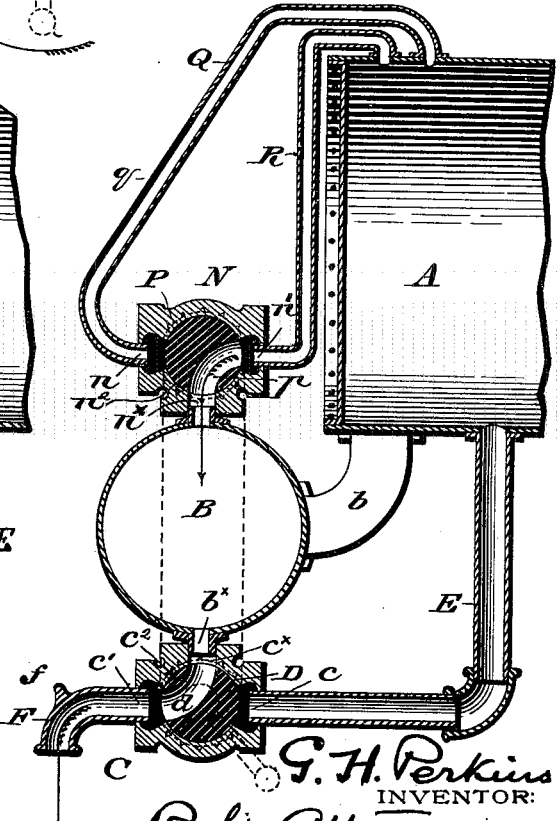

In the accompanying drawings, Figure 1 is an end elevational view of so much of the tank of a wagon tank, or tank wagon as I herein term it as is necessary for the understanding of my invention,—showing also complete the delivering tank and the valves which operate in connection therewith and with the tank wagon. Fig. 2 is a right hand side elevational view of the devices represented in Fig. 1. Fig. 3 is an inside elevational view of the lower sprocket wheel, showing the ratchet applied thereto. Figs. 4, 5, and 6, are right hand central, vertical, sectional, side elevations through the devices represented in Figs. 1 and 2, in the plane of the dotted line $x\ x$ upon Fig. 1 and sight being taken in the direction of the arrows upon said line. In each of these views the valve lever is indicated in dotted lines in the position which it occupies when the valves are in the position represented in the view to which it is shown applied. Fig. 7 is a fragmentary, central, side, sectional elevation through the delivering tank, the view being especially illustrative of the application of the displacement plug.

Similar letters of reference indicate corresponding parts in the drawings.

A is a portion of the tank of a tank wagon of suitable size to contain, when filled, a given quantity of oil, for instance five hundred gallons. This wagon tank is supposed to be mounted upon a running gear in the usual manner.

No illustration of the gearing is attempted for the reason that it is unnecessary to a comprehension of the features in which my invention resides.

B is a delivering tank, preferably cylindric, adapted to contain when filled a predetermined quantity of oil, for instance, five gallons. This delivering tank is applied to and connected with the tank A in any convenient manner, preferably by being secured to the bottom of said wagon tank at the rear end thereof, by means of a bracket casting $b$. The delivering tank is preferably so disposed relatively to the wagon tank that its axis is right angular to that of the wagon tank, as shown.

Leading from out the bottom of the delivering tank is a port, orifice, or passage way of any preferred character, being preferably a delivering pipe $b^x$ which terminates in, serves to support, and is connected with the delivery port $c^x$ of a three-way main valve chamber C, which is bored out to contain a conical or cylindric rotatable main valve or cock D, having formed in it a curved valve port $d$. The main valve chamber C is also provided with two other and lateral ports, which I respectively term the inlet port $c$ and the outlet port $c'$, and which are respectively in alignment with each other, and each as to its axis right angular with respect to the axis of the upper or delivery port of said chamber. The main valve chamber is also between its delivery port and its inlet port and between its delivery port and its outlet port, provided with two extended port closing surfaces $c^2$, being each segmental portions of the inner face of the tubular or conical valve seat or bore which is formed transversely through it, and which serves, when the main valve is in a certain position, by presenting to the respective mouths of the valve port, to occasion the closing of all of the ports of said main chamber, so that there can be no continuous flow or passage of liquid through its said ports in any direction.

Into the inlet valve port $c$ of the main valve chamber leads a communicating pipe E from the bottom of the wagon tank, which serves to place said tank in communication with said main valve chamber; and from out the outlet port of said main valve chamber leads a discharge spout F, which is conveniently at its outer extremity provided with a catch $f$ to retain the bail of a delivering bucket or selling measure in the filling of said bucket from said spout.

The main valve proper is, as stated, of cylindric or conical form and adapted to fit closely within a correspondingly-shaped bore or valve seat of the valve chamber, being conveniently retained in place by means of a washer $d^\times$ and nut $d^2$ applied to the threaded protruding rear end of the stem $d^3$ of said valve, as shown in Fig. 1. At its opposite or front end the main valve stem is provided with a valve lever $d^4$ by the throw of which the valve is rotated. It is, of course, to be understood that the main valve is if necessary, packed with respect to its chamber.

The valve port is so curved and disposed within the main valve that its mouths, according to the position in which said valve happens to be, are adapted to register, respectively, with the delivery port and with the inlet port, or with the delivery port and with the outlet port, or again with the two port-closing surfaces of the valve chamber. It will be apparent, therefore, that it will be possible when the main valve is set in the position represented in Fig. 4, to establish communication between the wagon tank and the delivering tank through the communicating pipe;—when the main valve is in the position represented in Fig. 5, to establish communication between the delivering tank and the discharge spout;—and when the main valve is in the position represented in Fig. 6 to cut off all communication and close all of the ports, in which last named position there will result neither a discharge of oil from the wagon tank to fill the delivering tank if empty, nor yet a discharge from said delivering tank, if full, to fill the delivering bucket.

In order to accurately determine the position of the port of the main valve with reference to the ports of the main valve chamber, it is, of course, possible to apply stops to the valve lever to stop it in the proper position at each end of its throw,—its vertical position, as in Figs. 1 and 2, in such instance, indicating that the valve is in the position represented in Fig. 6 and all ports closed. By the use of this main valve, therefore, and by a single movement of it, the delivering tank can be filled from the wagon tank, when so filled be retained full, and when full be emptied of its contents. The valve itself is so simple in construction and mode of operation as to be inexpensive, certain in action, easily operated, and durable.

In order to register each filling of the delivering tank, I connect with the main valve a register contrivance of any preferred character, such, for instance, as that illustrated in Figs. 1, 2, and 3 of the accompanying drawings, in which H is a dial register of any preferred variety, the dial of which is adapted to be advanced a given circumferential distance indicated upon a dial scale, upon each advance movement of a dial slide rod $h$.

I is a link, at its lower end, as shown in Figs. 1 and 2, pivotally connected by a pivot $i$ with the front face of the upper of two counterpart toothed spur wheels $i^2$ $i^3$ which are set in alignment one above the other and the teeth of which are engaged; the upper $i^2$, being conveniently mounted idly on a journal $i^4$ projecting from the delivering tank, and the lower $i^3$, fixedly mounted upon the main valve stem $d^3$ so as to rotate therewith, and at its upper extremity said link I is pivotally connected by a pivot pin $i^\times$ to what I term a register cam plate J, which is simply a plate adapted to have vertical movement in ways $j^\times$ applied to the end of the delivery tank alongside of the register. The cam plate has formed in it a cam groove $j$, within which is entered a cam stud $h^\times$ projecting from the dial slide $h$. The path of the cam groove is such as to occasion such predetermined lateral or horizontal movement of the dial slide rod as will occasion the movement of the dial to register a discharge of contents.

It is apparent that a throw of the valve lever from its vertical position, which it is shown as occupying in Fig. 2, to the left, or to that oblique position which is necessary to rotate the valve into the position represented in Fig. 4, will occasion the rotation of the lower spur wheel $i^3$ and a similar opposite rotation of the upper spur wheel $i^2$, and the consequent elevation of the link and register cam plate, and, by virtue of the cam stud within the cam groove, the lateral forward thrust of the dial slide rod, with the result of securing, as stated, such movement of the dial as will register the discharge from the wagon tank necessarily resulting when the main valve is in the position shown in Fig. 4. The subsequent return of the valve lever to the vertical position, or its deflection to the right, in which position the valve port occupies the position represented in Fig. 4, will both be without active effect upon the dial slide rod and, consequently, upon the dial.

It will be apparent from inspection of Fig. 2, that the cam groove $j$ in the register cam plate commences to act upon the cam stud $h^\times$ to occasion the inward thrust of the dial slide rod the instant the left hand deflection of the valve lever is commenced, and that the register therefore will perform its recording as soon as the dial slide rod commences to move. It is apparent therefore, that it can be of no advantage to the driver to draw less than the full contents of the delivering tank upon each withdrawal of the oil from the wagon tank to the delivering tank, for, in every such withdrawal or drawing, the amount of the full contents of the delivering tank will be automatically registered against him.

Instead of employing a register and register-actuating devices of the character above set forth, resort may be had to many other well known constructions of such devices, the adaptation of any one of which to my valve contrivances herein set forth is a matter of workshop skill.

In order to render it possible either to fill or to empty the delivery tank, it is manifest that said tank must be provided with an air-vent pipe of some character, and I now proceed to describe an air vent arrangement which I have devised and which forms a part of this invention:—

Leading from out the top of the delivering tank, preferably in alignment above the delivering pipe $b^x$, is what I term an escape port $n^x$, being the lower part of a three-way supplemental valve chamber N similar in general construction and character to the main valve chamber C and similarly disposed above the delivering tank in alignment over it. The escape port is, in effect, simply a pipe, orifice, or passage-way of any preferred character, incidentally supporting the supplemental valve chamber and establishing communication between the bore of said chamber and the delivering tank. The supplemental valve chamber N is bored out to contain a conical or cylindrical supplemental valve or cock P having formed in it a curved valve port $p$. The supplemental valve chamber is also provided with two other and lateral ports, which I respectively term the oil-vent port $n$ and the air-vent port $n'$, and which are respectively in alignment with each other and the axis of each of which is at right angles with that of the escape port. The supplemental valve chamber is likewise between its escape port and its oil-vent port and between its escape port and its air-vent port provided with two extended port-closing surfaces $n^2$, being each segmental portions of the inner face of the tubular or conical valve seat or bore which is formed transversely through it, and which serves when the supplemental valve P is in a certain position, by presenting to the respective mouths of its valve port $p$, to occasion the closing of all of the ports of said supplemental valve chamber N so that there can be no continuous flow or passage of liquid, air, or fluid through its said ports in any direction.

As will now be apparent, the supplemental valve chamber and its valve are in fact counterparts of the main valve chamber and its valve, except that they are reversely disposed, the escape port $n^x$ of the supplemental valve chamber, which corresponds to the delivery port $C^x$, being mounted to open downwardly, whereas the port $c^x$ opens upwardly. Into the oil-vent port $n$ of the supplemental valve chamber leads an oil-vent pipe Q which is extended upward and opened into the upper part of the wagon tank, and which serves to establish communication between said supplemental valve chamber and the wagon tank; while into the air-vent port of said valve chamber leads an air-vent pipe R which similarly extends upward and opens into the upper part of said wagon tank, and which serves to establish additional communication between the valve chamber and the wagon tank.

The oil vent pipe is preferably with a glass section $q$ through which the level of the oil in said pipe may be detected.

The supplemental valve proper is, as stated, of cylindric or conical form and adapted to fit closely within a correspondingly-shaped bore or valve seat of the supplemental valve chamber, being conveniently also retained in place by means of a washer $r^x$ and nut $r^2$ applied to the threaded protruding rear end of the stem $r^3$ of said valve, as shown in Fig. 1. The opposite or front end of the supplemental valve stem is projected to the same extent as is the main valve stem $d^3$ and provided with a sprocket wheel S, and a similar sprocket wheel $S^x$ is also provided upon the main valve stem, while a sprocket chain O establishes connection between said counterpart sprocket wheels on said respective valve stems, and consequently connection for common rotation between the valves of which said stems are members.

The valve port $p$ of the supplemental valve P is so curved and disposed within the said valve that its mouth, in accordance with the position in which the valve happens to be, is adapted to register, respectively, with the escape port and with the oil vent port, or with the escape port and with the air-vent port, or, again, with the two port-closing surfaces, of the supplemental valve chamber, but when in said last named position, as will be apparent from an inspection of Fig. 6, the port of the supplemental valve is reversed as to or as compared with the port of the main valve. This last named position of the valve, or that shown in Fig. 6 and supposed in Figs. 1 and 2, being the normal position, it will be apparent that, when the main valve is in the position referred to in said figures and its port in registry with the port-closing surfaces of its valve chamber, the port of the supplemental valve will be similarly in registry with the port-closing surfaces of the supplemental valve chamber, and all the ports of both the valve chambers will be closed and no passage of liquid, fluid, or air possible through either valve in any direction. When, however, the main valve is rotated into the position represented in Fig. 4, its throw will, through the sprocket chain and wheels, be communicated to the supplemental valve, which will be rotated into the position shown in said Fig. 4, and in this position, therefore, communication will be established not only between the tank wagon and the delivering tank but also between the delivering tank and the oil-vent pipe, with the result that when the delivering tank is full the oil will rise through the supplemental valve into the oil-vent pipe and therein establish itself upon a level equal to that occupied by the oil in the wagon tank. When, on the other hand, the main valve is rotated into the position represented in Fig. 5, and communication established between the delivering tank and the discharge spout, the supplemental valve will be rotated into the position also shown in said Fig. 5, and communication be established between the delivering tank and the air-vent pipe, with the result that it becomes possible to discharge the delivering tank. After the discharge of the delivering tank a further continued rotation of the main valve will re-establish both valves in the position represented in Fig. 6, in which again all ports will be closed.

In order to exactly determine the five gallon or other quantity which it is desired that the delivering tank should contain, I provide said tank with a displacement plug T as I term it, the same being simply a threaded plug threaded through a threaded, and perfectly packed, boxing $t$ in the end of the delivery tank. By the adjustment of this plug, as is apparent the exact containing capacity of the delivering tank can be regulated at will.

In order to prevent the reverse rotation of the sprocket wheel $S^x$ upon the main valve stem $d^3$, I find it convenient to apply a ratchet $s'$ to the inner face of said sprocket wheel, a spring-controlled pawl $s^2$ bearing against the teeth of said ratchet. Of course, it is to be understood that, in practice, the delivering tank, its valves, and the valve connections, are all inclosed in a case so as to prevent the possibility of their being tampered with.

While I find a sprocket chain and sprocket wheels a convenient means for connecting the main and supplemental valves, it is obvious that other connecting devices may be employed in their stead.

Having thus described my invention, I claim:—

1. In combination,—a wagon tank,—a delivering tank,—a communicating pipe between said tanks,—a discharge spout, a three-way main valve chamber the valve of which when placed in one position establishes communication between the tanks, when placed in another position establishes communication between the delivering tank and the discharge spout,—and when placed in yet another position cuts off all communication,—an oil-vent pipe,—an air-vent pipe,—and a three-way supplemental valve chamber the valve of which when placed in one position establishes communication between the delivering tank and the oil-vent pipe, when placed in another position establishes communication between the delivering tank and the air vent pipe, and when placed in yet another position cuts off all communication,—substantially as set forth.

2. In combination,—a wagon tank,—a delivering tank,—a communicating pipe between said tanks,—a discharge spout,—a three-way main valve chamber the valve of which when placed in one position establishes communication between the tanks, when placed in another position establishes communication between the delivering tank and the discharge spout,—and when placed in yet another position cuts off all communication,—an oil-vent pipe,—an air vent pipe,—a three-way supplemental valve chamber the valve of which when placed in one position establishes communication between the delivering tank and the oil-vent pipe, when placed in another position establishes communication between the delivering tank and the air-vent pipe, and when placed in yet another position cuts off all communication,—and a register,—substantially as set forth.

3. In combination,—a wagon tank,—a delivering tank,—a communicating pipe between said tanks,—a discharge spout,—a three-way main valve chamber the valve of which when placed in one position establishes communication between the tanks, when placed in another position establishes communication between the delivering tank and the discharge spout,—and when placed in yet another position cuts off all communication,—an oil-vent pipe,—an air-vent pipe,—a three-way supplemental valve chamber the valve of which when placed in one position establishes communication between the delivering tank and the oil-vent pipe, when placed in another position establishes communication between the delivering tank and the air-vent pipe and when placed in yet another position cuts off all communication,—and suitable means, such, for instance, as the sprocket chain and wheels, for connecting said valves and occasioning their connected movement, substantially as set forth.

4. In combination,—a wagon tank,—a delivering tank,—a communicating pipe between said tanks,—a discharge spout,—a three-way main valve chamber the valve of which when placed in one position establishes communication between the tanks, when placed in another position establishes communication between the delivering tank and the discharge spout,—and when placed in yet another position cuts off all communication,—an oil-vent pipe,—an air vent pipe,—a three-way supplemental valve chamber the valve of which when placed in one position establishes communication between the delivering tank and the oil-vent pipe, when placed in another position establishes communication between the delivering tank and the air-vent pipe and when placed in yet another position cuts off all communication,— suitable means, such, for instance, as the sprocket chain and wheels, for connecting said valves and occasioning their connected movement,—and a register connected with the main valve and operating to register each time that the valve is operated to occasion the discharge of the delivering tank,—substantially as set forth.

5. In combination, a wagon tank, a delivering tank, a three-way main valve chamber, a three-way main valve, a communicating pipe between the wagon tank and the main valve chamber, a communicating pipe or port between the valve chamber and the delivering tank, a discharge spout from the valve chamber, a three-way supplemental valve chamber, a three-way supplemental valve, an oil-vent pipe, an air-vent pipe, and mechanism, essentially, for instance, such as set forth, for connecting the valves and occasioning their connected movement, substantially as set forth.

6. In combination, a wagon tank, a delivering tank, a three-way main valve chamber, a three-way main valve, a communicating pipe between the wagon tank and the main valve chamber, a communicating pipe or port between the valve chamber and the delivering tank, a discharge spout from the valve chamber, a three-way supplemental valve chamber, a three-way supplemental valve, an oil-vent pipe, an air-vent pipe, mechanism, essentially, for instance, such as set forth, for connecting the valves and occasioning their connected movement, and a register connected with the main valve and operating to register each time that the valve is opened to occasion the discharge of the delivering tank, substantially as set forth.

In testimony that I claim the foregoing as my invention I have hereunto signed my name this 19th day of July A D 1888.

GEORGE H. PERKINS.

In the presence of—
J. BONSALL TAYLOR,
WM. C. STRAWBRIDGE.